(12) United States Patent
Gutekunst et al.

(10) Patent No.: US 8,239,602 B2
(45) Date of Patent: Aug. 7, 2012

(54) FIELD BUS SYSTEM WITH ADDRESS CONNECTOR

(75) Inventors: Juergen Gutekunst, Nuertingen (DE); Florian Hermle, Neuhausen (DE)

(73) Assignee: BALLUFF GmbH, Neuhausen (DE)

( * ) Notice: Subject to any disclaimer, the term of this patent is extended or adjusted under 35 U.S.C. 154(b) by 180 days.

(21) Appl. No.: 12/592,292

(22) Filed: Nov. 20, 2009

(65) Prior Publication Data

US 2010/0146182 A1    Jun. 10, 2010

(30) Foreign Application Priority Data

Nov. 25, 2008  (DE) .......................... 10 2008 060 006

(51) Int. Cl.
*G06F 13/14* (2006.01)
(52) U.S. Cl. ............................... 710/305; 710/64; 710/3
(58) Field of Classification Search .......... 710/104–110, 710/300–315, 8–19, 1–3, 29–30, 62–64; 709/249, 230, 236; 370/395
See application file for complete search history.

(56) References Cited

U.S. PATENT DOCUMENTS

| | | | | |
|---|---|---|---|---|
| 6,701,377 B2 * | 3/2004 | Burmann et al. | ............ | 709/249 |
| 6,788,700 B1 * | 9/2004 | Nakil | ............ | 370/419 |
| 6,952,727 B1 * | 10/2005 | Lindner et al. | ............ | 709/224 |
| 6,999,996 B2 * | 2/2006 | Sunderland | ............ | 709/208 |
| 7,031,660 B2 | 4/2006 | Vonheim et al. | | |
| 7,502,323 B2 * | 3/2009 | Brun et al. | ............ | 370/235 |
| 7,872,971 B2 * | 1/2011 | Fujisawa et al. | ............ | 370/230 |
| 2004/0137845 A1 | 7/2004 | Vonheim et al. | | |
| 2007/0019369 A1 | 1/2007 | Merkel et al. | | |
| 2009/0097502 A1 * | 4/2009 | Yamamoto | ............ | 370/466 |

FOREIGN PATENT DOCUMENTS

| | | |
|---|---|---|
| DE | 103 18 451 | 11/2004 |
| DE | 602 09 881 | 9/2006 |
| EP | 1 441 580 | 7/2004 |
| WO | WO 2004/088928 | 10/2004 |

OTHER PUBLICATIONS

Data Sheet, ILB BT ADIO 2/2/16/16, Phoenix Contact GmbH & Co. KG, Sep. 2007, 19 pages (English language translation unavailable).

* cited by examiner

*Primary Examiner* — Raymond Phan
(74) *Attorney, Agent, or Firm* — Lipsitz & McAllister, LLC

(57) ABSTRACT

Field bus system, comprising (i) at least one field bus module with a connection unit for the connection to a network, wherein a control unit can be connected to the network and the at least one field bus module can be addressed in the network, and with a plurality of ports for the connection of field devices, in particular sensors and/or actuators, and (ii) at least one address connector which has a non-volatile memory for an address, wherein the at least one field bus module has an address port for the at least one address connector and the address of the at least one address connector in the network is communicated to the field bus module via its connection.

18 Claims, 4 Drawing Sheets

FIELD BUS SYSTEM WITH ADDRESS CONNECTOR

The present disclosure relates to the subject matter disclosed in German application number 10 2008 060 006.7 of Nov. 25, 2008, which is incorporated herein by reference in its entirety and for all purposes.

BACKGROUND OF THE INVENTION

The invention relates to a field bus system, comprising at least one field bus module with a connection unit for the connection to a network, wherein a control unit can be connected to the network and the at least one field bus module can be addressed in the network, with a plurality of ports for the connection of field devices, in particular sensors and/or actuators.

A field bus is an industrial communications system which connects a plurality of field devices (in particular sensors and/or actuators) to the control unit as primary control device.

The field bus modules are distributor devices (distributor boxes) which provide for the direct communication with the control unit and distribute data and signals from field devices or to field devices.

SUMMARY OF THE INVENTION

In accordance with the invention, a field bus system is provided which can be put into operation in a simple manner.

In accordance with the invention, at least one address connector is provided which has a non-volatile memory for an address, wherein the at least one field bus module has an address port for the at least one address connector and the address of the at least one address connector in the network is communicated to the field bus module via its connection.

So that a field bus module can be identified in the network, this must be addressed accordingly. When the network is more complex, such as, for example, based on the Ethernet, an address can, in principle, be set at a corresponding field bus module via mechanical elements, such as, for example, a rotary switch. This does, however, require considerable resources for the production of a field bus module. Furthermore, when a specific protection category, such as IP 67, is intended to be achieved, additional resources are necessary for sealing or the like.

In the case of the solution according to the invention, at least one address connector is provided which can be programmed accordingly in order to store an address in the memory. The address for a field bus module is transferred to the address connector and so the field bus module needs to be modified only minimally in that only one corresponding address port has to be provided.

The field bus module will be addressed by way of a simple connection, such as, for example, pushing or screwing the address connector onto the field bus module. All the information for proper operation of the field bus module will be loaded into it via the address connector.

As a result, a field bus module can be replaced, for example, in a simple manner. The corresponding address connector will be released and the field bus module will be exchanged. The address connector will be screwed or pushed into the newly replaced field bus module and a corresponding addressing will take place as a result.

The setting-up time of the field bus system may be reduced considerably as a result. Furthermore, the downtime may be minimized. Addressing is possible via a "plug and play" method.

The housing of the field bus module need not be opened for addressing to be possible.

The addresses may be set in a simple manner.

The network is, in particular, Ethernet-based. This results in extensive application possibilities.

The address is then, in particular, an IP address and so extensive application possibilities result.

It is favorable when the at least one address connector has a communication unit for communicating with the field bus module via the address port. As a result, a memorized address can be loaded into the field bus module in a simple manner for the purpose of addressing it.

In this respect, it may be provided for the communication unit to be designed to be bidirectional. As a result, it is possible, for example, to activate an address connector via the control unit. This can make error detection easier in combination with a corresponding display unit. It is also possible, for example, via a bidirectional design of the communication unit which then comprises, in particular, a serial interface, to program the address connector with an address by way of a corresponding set-up.

In this respect, it is, in principle, possible for the at least one address connector to have a connection for programming an address which is separate from the communication unit for communicating with the field bus module. For example, an address connector can comprise an additional serial interface for the programming of an address. As mentioned above, it is, however, also possible for such an interface to be integrated into the communication unit.

The at least one address connector is advantageously supplied with energy via the at least one field bus module when the address connector is connected. In principle, no separate, internal energy supply device need be provided for an address connector. This may, as a result, be of a correspondingly simple design.

The at least one address connector favorably comprises a control unit which is realized, in particular, by way of a microcontroller. The communication with a field bus module may be controlled via the control unit. In particular, it is, as a result, possible in a simple manner to automatically assign a memorized address to a field bus module when this is connected to the address connector. As a result, it is also possible in a simple manner, for example, to activate a display unit for an optical display unit in accordance with the state of the address connector.

It is favorable when the address connector comprises an acoustic and/or optical display unit. As a result, the addressing state of the address connector can be detected acoustically and/or optically in a simple manner. For example, a user can then easily recognize whether the address connector has loaded a valid address or not. It is also possible, when a corresponding, effective signal connection to a field bus module exists, to use the address connector as a display unit for a state of the field bus module.

It is favorable when the display unit comprises at least one of the following modes, namely (i) no valid address is loaded in the address connector or (ii) an address is loaded in the address connector. As a result, a user can recognize immediately whether addressing is successful or not, in particular when an address connector is connected to a field bus module.

The display unit is activated, in particular, by way of connection of the at least one address connector to the at least one field bus module. As a result, it is possible to recognize at an application, such as a machine, in a simple manner whether addressing has been successful.

It is, in principle, also possible for the display unit to be activatable via a communication unit of the at least one address connector. As a result, it is possible, for example, to activate the address connector via the control unit. As a result, excessive voltage or the like at a specific field bus module can be displayed, for example, via the address connector, initiated by the control unit. As a result, the localization of errors is made easier for a user.

It is favorable when an effective signal connection between the connection unit of the at least one field bus module to the network and the address port is present. As a result, it is possible to transfer signals, which are transferred via the network, to the address connector. As a result, it is possible, for example, to display warning messages, which are specific for a certain field bus module, at the associated address connector.

The at least one address connector is designed, in particular, to be without any cable outlet. As a result, it can be realized in a simple manner and it has less space requirements. In principle, energy can be supplied to the address connector via a field bus module. The address in an address connector is stored in the non-volatile memory.

In one preferred embodiment, a fixing device, via which the at least one address connector can be fixed to a cable and/or to an application, is arranged on the at least one address connector. Field bus modules are arranged at specific locations of an application. The field bus modules each have specific addresses. This means that specific addresses are associated with certain areas of an application. An address connector may be allocated to such an area via the fixing device so as to be secured against loss. As a result, an exchange of a field bus module can, for example, be carried out in a simple manner since a renewed addressing is possible in a simple manner as a result of the arrangement of the address connector at the associated area in a manner secured against loss.

The fixing device has, in particular, an extension part and a fixing part for the purpose of fixing to the cable or the application. The extension part, which is, for example, a chain, a tape or the like, allows a flexible usability with fixing to the cable or the application in a manner secured against loss.

The at least one address connector is fixed, in particular, to a network cable or energy supply cable for the at least one field bus module. When it is fixed, in particular to a network cable, an address of the network may be allocated spatially to a certain area of an application.

It may be provided for the address port of the at least one field bus module to have at least one additional function. For example, the address port can comprise, in addition, a USB connector.

It is favorable when the at least one address connector can be pushed or screwed into the address port. A transfer of data with downloading of the address into the field bus module is possible in an automated manner (insofar as the field bus module is supplied with electrical energy) when, in particular, the corresponding connection is realized by way of pushing or screwing the address connector in.

The following description of preferred embodiments serves to explain the invention in greater detail in conjunction with the drawings.

DETAILED DESCRIPTION OF THE INVENTION

Figure 1:
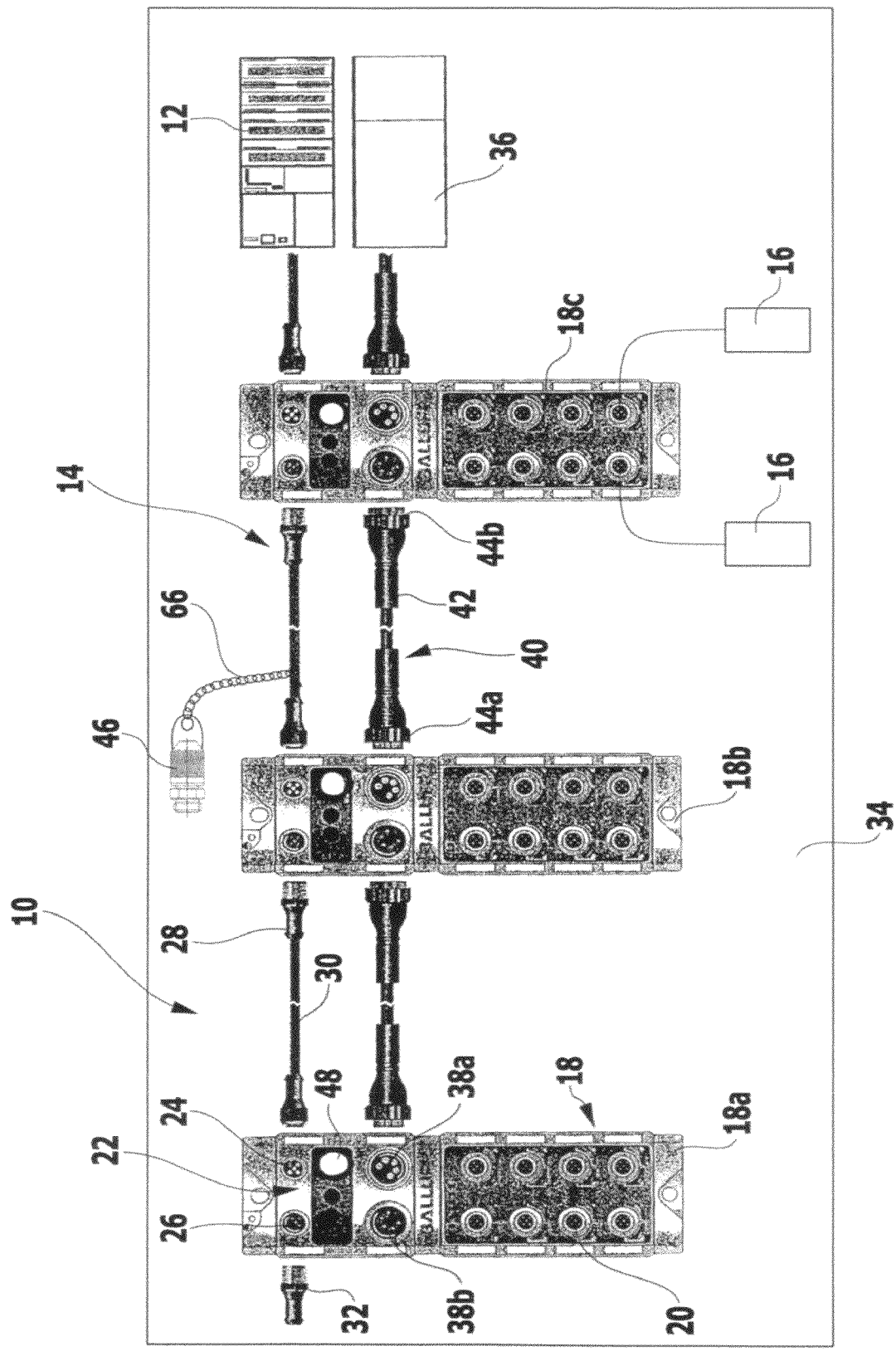
FIG. 1 shows a schematic illustration of one embodiment of a field bus system according to the invention which is arranged on an application.

One embodiment of a field bus system according to the invention, which is shown schematically in FIG. 1 and designated as 10, comprises a control unit 12 which is connected to a network (field bus) 14. The field bus 14 is a network, via which field devices 16 are connected to the control unit 12 in a signal effective manner. The control unit 12 can, as a result, activate the field devices 16 or receive and, for example, evaluate signals which are provided by the field devices 16. The field bus 14 is a communications system which connects the field devices 16 to the control unit 12 in a signal effective manner.

The field devices 16 are, in particular, sensors and/or actuators.

The field bus system 10 comprises a plurality of field bus modules 18. Three field bus modules 18a, 18b, 18c are shown in FIG. 1.

A field bus module 18 is an intermediate device between the field devices 16 and the control unit 12. A field bus module 18 is a distributor box which collects data from the field devices 16 respectively connected to it and passes this data to the control unit 12 (in particular, when the field devices 16 are sensors) or collects data, such as control data, from the control unit 12 and passes this to the field devices 16 (in particular, when the field devices 16 are actuators).

A field bus module 18 comprises a plurality of ports 20, to which field devices 16 can be connected.

A field bus module 18 can, in addition, be connected to the field bus 14 via a connection unit 22. The connection unit 22 comprises, in particular, a first port 24 for the connection to an adjacent field bus module and a second port 26 for the connection to an additional adjacent field bus module.

Plug-in connectors 28 are provided as connecting elements, via which field bus modules 18 can be connected and, as a result, the field bus 14 is provided.

All the field bus modules 18a, 18b, 18c are connected to the network 14 via the corresponding first ports 24 and second ports 26 and, as a result, to the control unit 12 in a signal effective manner.

The plug-in connectors 28 comprise cables 30, insofar as necessary, in order to be able to provide a connection at a corresponding distance from adjacent field bus modules 18.

The field bus system 10 comprises (at least) one terminating resistor 32 which is inserted into the second port 26 of the last field bus module 18 (in FIG. 1, this is field bus module 18a) at the second port 26. A terminating resistor 32 guarantees a secure transfer of data in the network 14.

The field bus modules 18 are fixed in place at a suitable location of an application 34. The application 34 is, for example, a machine, such as a machine tool or the like. The positions of the field bus modules 18 are selected such that the field devices 16 connected thereto can preferably undertake the tasks allotted to them (such as sensor tasks or actuator tasks) whilst minimizing the cable run.

The field bus modules 18 are supplied with electrical energy via an energy supply unit 36. The field bus modules 18 have, for this purpose, corresponding energy supply ports 38a, 38b. These are arranged and designed such that an energy supply bus 40 can be realized. One field bus module (in FIG. 1, the field bus module 18c) is connected directly to the energy supply unit 36. Additional field bus modules 18 can then receive their electrical energy from field bus modules which are connected directly or indirectly to the energy supply unit 36. For example, the field bus module 18*b* according to FIG. 1 receives its electrical energy via the field bus module 18*c*. The field bus modules 18 are connected to corresponding energy supply connectors 44*a* and 44*b* via an energy supply cable 42.

The field bus 14 is, in particular, Ethernet-based. Each field bus module 18 has a specific address in the network 14 and so the control unit 12 can associate control data or data received with the specific field devices 16. The address is, in particular, an IP address which typically has four octets (for example, 192.168.101.4). The subnet mask (for example, 255.255.225.0) and the gateway address (for example, 0.0.0.0) are also used for exact identification.

The field bus system 10 comprises address connectors 46, via which the field bus modules 18 can be addressed, i.e., via which a particular address in the field bus 14 is communicated to specific field bus modules 18.

A field bus module 18 has, for this purpose, an address port 48. This is separate from the connection unit 22 and the ports 20 for the field devices 16 as well as from the energy supply ports 38*a*, 38*b*.

Figure 3:
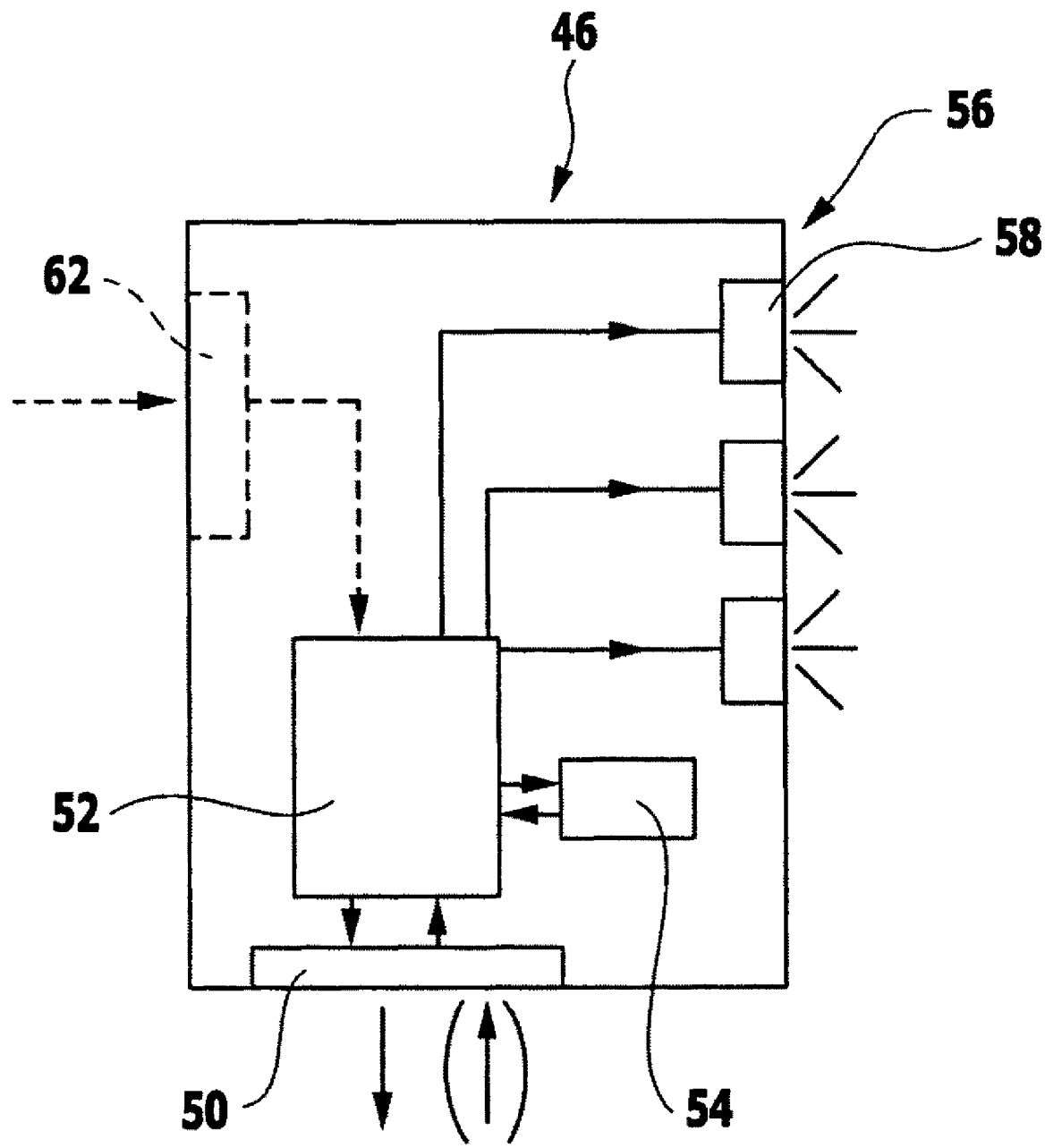
FIG. 3 shows a schematic illustration of the electronic construction of an address connector.

The address connector 46 can be pushed or screwed into the associated address port 48. It comprises, as shown schematically in FIG. 3, a communication unit 50, via which data can be exchanged with the field bus module 18. The communication unit 50 is designed such that, when the corresponding field bus module 18 is connected to the energy supply unit 36, the address connector 46 is supplied with electrical energy by the field bus module 18.

In principle, the communication unit 50 is designed such that an address stored in the address connector 46 can be communicated to the field bus module 18. In one preferred embodiment, the communication unit 50 is bidirectional and so the address connector 46 can also receive data from the field bus module 18.

The address connector 46 comprises, in addition, a control unit 52. This controls the functioning of the address connector 46.

A non-volatile memory 54, in which an address can be stored, is connected to the control unit 52. The memory 54 can be read by the control unit 52 and the corresponding address data can be supplied to the field bus module 18 via the communication unit 50.

The address connector 46 has, in addition, a display unit 56 which can be activated by the control unit 52. The display unit 56 is an acoustic and/or optical display unit.

Figure 2:
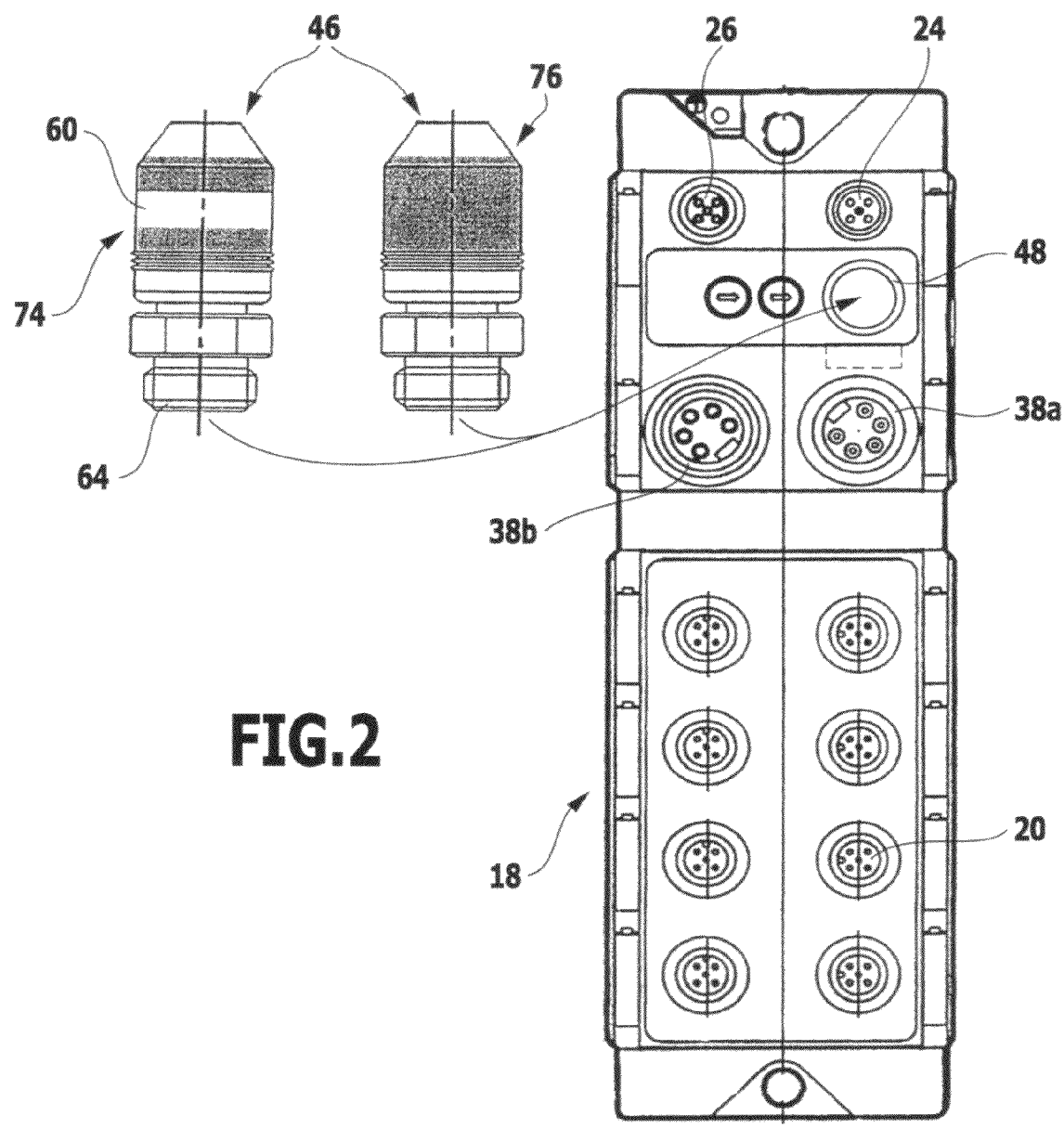
FIG. 2 shows an enlarged illustration of a field bus module with address connector.

In the example of an optical display unit, one or more light-emitting diodes 58 are provided which are sheathed, for example, by a corresponding housing 60 (FIG. 2), wherein the housing 60 is transparent at least in the area of the light-emitting diodes.

It is, in principle, possible for an address to be loaded into the address connector 46 via a communication unit 50 which is designed to be bidirectional. For this purpose, a corresponding programming unit is provided for the address connector 46 and this can be programmed by corresponding means (such as, for example, a computer or the like) or by the control unit 12.

It is, in principle, also possible for the address connector 46 to have a separate port 62, such as, for example, a serial port, via which it can be connected directly, for example, to a computer or to the control unit 12 for the purpose of loading the address.

The control unit 52 may be realized, in particular in combination with the communication unit 50, by a microcontroller, into which the memory 54 can also be integrated.

The address connector 46 has a connecting device 64, via which it can be connected mechanically to the field bus module 18. A pure plug-in connection may be provided or also a screw connection.

In one embodiment, the address connector 46 comprises a fixing device 66. The fixing device 66 comprises an extension part 68 and a fixing part 70. The extension part 68 is connected not only to the fixing part 70 but also to the housing 60 of the address connector 46. The extension part 68 is an element or comprises an element which makes a flexible positioning of the address connector 46 relative to the fixing part 70 possible, wherein the address connector 46 is held in a flexible manner.

Figure 4:
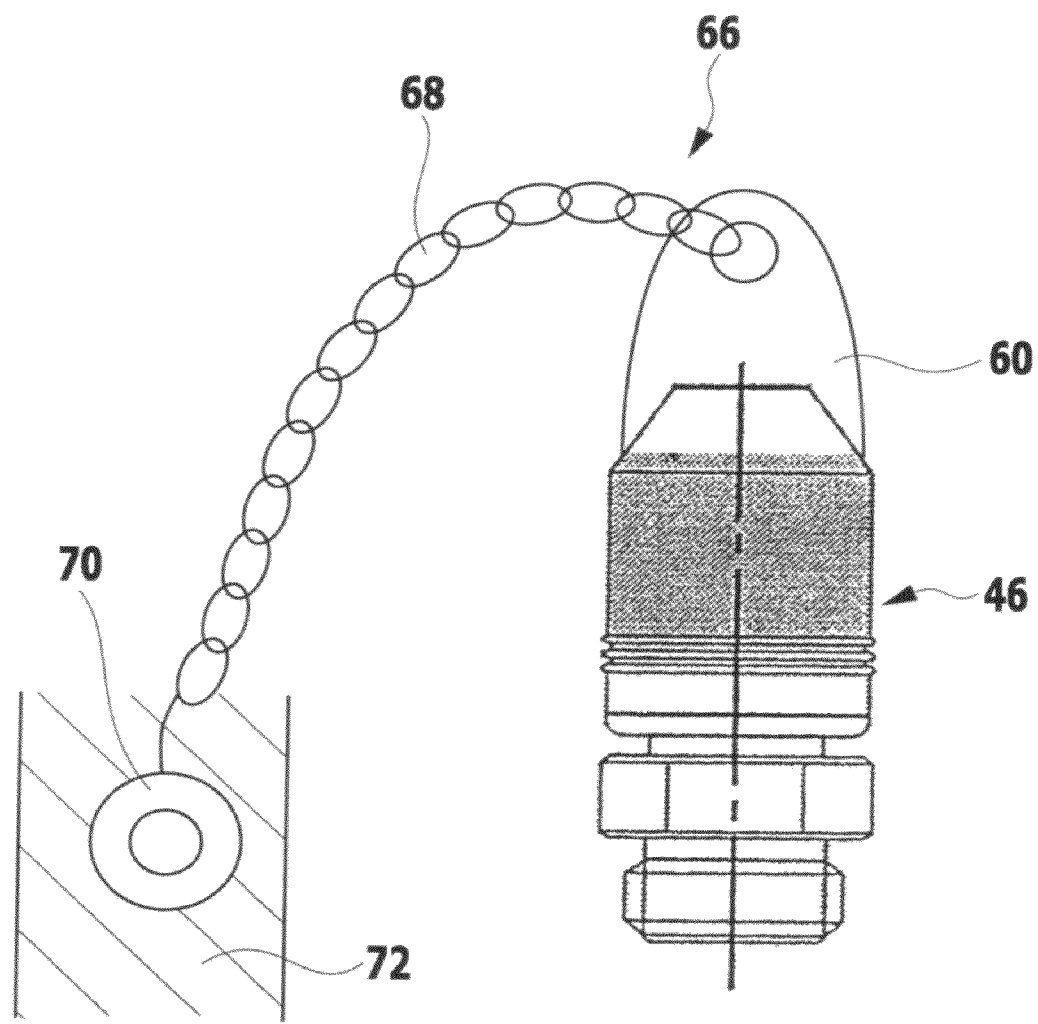
FIG. 4 shows a schematic illustration of an address connector with fixing device.

The address connector 46 may be fixed, for example, to a cable 30, which leads to the corresponding field bus module 18, via the fixing part 70. Alternatively, a corresponding address connector 46 can also be fixed directly to a corresponding area 72 (FIG. 4) of the application.

This results in a local fixing in position of a corresponding address connector 46, by means of which the address connector 46 is held in a specific area of the application 34 so as to be secured against loss. When an associated field bus module 18 needs to be replaced, the address connector 46 is available for addressing the newly replaced field bus module 18.

The field bus system 10 according to the invention operates as follows and the addressing, in particular, takes place as follows:

Data are transferred to the field bus modules 18 from the control unit 12. The field bus modules each have specific, precise addresses in the network 14 which is, in particular, Ethernet-based. The data can then be passed to the field devices 16. When the field devices 16 supply data, these are transmitted from the field bus modules 18 to the control unit 12, wherein the addresses are also transmitted during this transmission so that the control unit 12 can identify which data originate from which field bus module 18.

The address connectors 46 are provided for addressing the field bus modules 18. The respective address connectors 46 are loaded with addresses, as described above. The addresses are stored in the non-volatile memory 54.

When the address connector 46 is connected to a corresponding address port 48 of the corresponding field bus module 18, the stored address is transferred to the field bus module 18 and this is addressed as a result.

In the case of the solution according to the invention, the address for addressing a field bus module 18 is downloaded completely into the address connector 46 (prior to connection to the address port 46). As a result, no auxiliary tools, such as rotary switches or the like, are necessary at the field bus modules 18 which can, as a result, be of a correspondingly simpler design. As a result, a high protection category, such as IP 67, may also be achieved with simple means since no rotary switch or the like need be sealed, in addition. By connecting the address connector 46, when a valid address is loaded, all the necessary information for proper operation is loaded into the corresponding field bus module 18.

As a result, the field bus system 10 may be addressed in a simple manner. The addressing of the field bus modules 18 may be set without any additional aids (apart from the aids for addressing the address connector 46). In principle, no programming knowledge is required for the addressing in the field bus 14. The stoppage times may be reduced considerably since the right addressing in the sense of plug and play takes place immediately as a result of connection of the address connectors when these are provided with a valid address.

It may be provided for the display unit 56 to have several modes. In particular, one mode is provided (indicated in FIG. 2 by the reference numeral 74) which shows that no valid address is loaded (either in the sense that no address is loaded or the address is not in the correct format). This will be indicated, for example, by the flashing of one or more light-emitting diodes.

In a further mode (reference numeral 76 in FIG. 2), it is indicated that an address is loaded. In this case, for example, one or more light-emitting diodes light up permanently.

The display unit 56 will be activated, in particular, only when the corresponding address connector 46 is connected to an address port 48 and the corresponding field bus module 18 is supplied with electrical energy.

In this respect, it is possible for an effective signal connection to be present between the connection unit 22 with the first port 24 and the second port 26 and the address port 48. As a result, signals from the control unit 12 can be transferred via the field bus 14 and the field bus module 18 to the address connector 46 in the case of a directionally designed communication unit 50. As a result, it is possible, for example, when the control unit 12 establishes a problem or the like at a specific field bus module 18, to activate the corresponding address connector 46 which is pushed into the field bus module 18 and cause the display unit 56 to show a specific signal. This makes it easier for a user to localize errors which, on the other hand, results in a reduction in stoppage times.

As a result of the fixing device 66, an address connector 46 may be connected directly to the corresponding field bus cable 30. As a result, a local coding is obtained. The address connector 46 is allocated logically to the network which is expecting a component with the address stored in the address connector 46 at the corresponding network port.

The field bus modules 18 are realized, in particular, according to the category of protection IP 67.

The address connector 46 preferably has no cable outlet.

The control unit 52 can load addresses into the memory 54 when it is activated accordingly via the communication unit 50 or via the separate port 62. The interface for the programming of an address into the memory 54 is, in particular, a serial interface. As mentioned above, the serial interface can be integrated into the communication unit 50 or be provided as a separate port 62.

In principle, it is also possible in the case of bidirectional communication for the field bus module 18, which then has, in particular, a non-volatile memory for the address, to load its address into the address connector 46 when no valid address is stored in it.

As a result of the solution according to the invention, a field bus system 10 is realized which can be constructed in a simple manner on account of its simple addressability. Addressing can be simple, in particular, when the field bus system is Ethernet-based.

In principle, it is provided for the address connector 46 to remain in the associated field bus module 18 when this is intended to remain addressed.

In principle, it is also possible for the address port 48 at a field bus module 18 to have one or more additional functions. For example, it can comprise a USB port.

The invention claimed is:

1. Field bus system, comprising:
at least one field bus module with a connection unit for a connection to a network,
a control unit connectable to the network,
the at least one field bus module being addressable in the network and comprising a plurality of ports for the connection of field devices, the field devices comprising at least one of sensors and actuators; and
at least one address connector having a non-volatile memory for a network address of the at least one field bus module;
wherein:
the at least one field bus module has an address port for the at least one address connector,
the network address is communicated from the at least one address connector to the at least one field bus module via the address port;
the at least one address connector is designed to be without any cable outlet; and
the at least one address connector is adapted to be pushed or screwed into the address port.

2. Field bus system as defined in claim 1, wherein the network is Ethernet-based.

3. Field bus system as defined in claim 1, wherein the network address is an IP address.

4. Field bus system as defined in claim 1, wherein the at least one address connector has a communication unit for communicating with the at least one field bus module via the address port.

5. Field bus system as defined in claim 4, wherein the communication unit is designed to be bidirectional.

6. Field bus system as defined in claim 1, wherein the at least one address connector is supplied with energy via the at least one field bus module when the address connector is connected to the at least one field bus module.

7. Field bus system as defined in claim 1, wherein the at least one address connector comprises a control unit.

8. Field bus system as defined in claim 1, wherein the address connector comprises at least one of an acoustic and an optical display unit.

9. Field bus system as defined in claim 1, further comprising an effective signal connection between the connection unit of the at least one field bus module to the network and the address port.

10. Field bus system as defined in claim 1, wherein a fixing device is arranged on the at least one address connector, the at least one address connector being fixable to at least one of a cable and an application via said fixing device.

11. Field bus system as defined in claim 1, wherein the address port of the at least one field bus module has at least one additional function.

12. Field bus system as defined in claim 4, wherein:
the at least one address connector has a connection port for programming the network address,
the connection port for programming the network address is separate from the communication unit.

13. Field bus system as defined in claim 8, wherein the display unit comprises at least one of the following modes: (i) no valid network address is loaded in the address connector, (ii) a network address is loaded in the address connector.

14. Field bus system as defined in claim 8, wherein the display unit is activated by way of connection of the at least one address connector to the at least one field bus module.

15. Field bus system as defined in claim 8, wherein the display unit is activatable via a communication unit of the at least one address connector.

16. Field bus system as defined in claim 10, wherein the fixing device has an extension part and a fixing part for fixing to the cable or the application.

17. Field bus system as defined in claim 10, wherein the at least one address connector is fixed to a network cable or energy supply cable for the at least one field bus module.

18. Field bus system as defined in claim 15, wherein the display unit of the at least one address connector is activatable by the control unit.

\* \* \* \* \*